(12) United States Patent
Yoshida et al.

(10) Patent No.: US 6,437,320 B1
(45) Date of Patent: Aug. 20, 2002

(54) OPTICAL AMPLIFIER CONTROL UNIT, OPTICAL AMPLIFICATION APPARATUS, AND TRANSMISSION SYSTEM

(75) Inventors: Takashi Yoshida; Chitaka Konishi, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/557,575

(22) Filed: Apr. 21, 2000

(30) Foreign Application Priority Data

Apr. 27, 1999 (JP) .......................................... 11-119009
Apr. 27, 1999 (JP) .......................................... 11-119713

(51) Int. Cl.[7] .............................. G01J 1/04; G01J 1/42; G01J 5/08
(52) U.S. Cl. .............................. 250/227.11; 250/214 A; 250/214 AG; 250/238
(58) Field of Search ........................ 250/227.11, 214 R, 250/214 A, 214 LA, 214 AG, 238; 330/308, 59

(56) References Cited

U.S. PATENT DOCUMENTS 5,245,690 A * 9/1993 Aida et al. ................... 385/142

FOREIGN PATENT DOCUMENTS

| JP | A 4-11794 | 1/1992 |
|---|---|---|
| JP | A 4-99080 | 3/1992 |
| JP | A 5-82873 | 4/1993 |
| JP | A 8-264871 | 10/1996 |
| JP | A 9-162476 | 6/1997 |
| JP | A 9-246638 | 9/1997 |
| JP | A 10-51057 | 2/1998 |
| JP | A 10-150414 | 6/1998 |
| JP | A 10-173266 | 6/1998 |
| JP | A 10-257028 | 9/1998 |
| JP | A 10-335722 | 12/1998 |
| JP | A 2000-299518 | 10/2000 |

OTHER PUBLICATIONS

N. Kagi et al., "Supervisory Signal Transmission For Optical Amplifiers Using Polarization Modulators", Technical Digest Of IEICE (Institute Of Information, Electronics And Communication Engineers Of Japan) , Optical and Quantum Electronics OQE92–21 and Optical Communication Systems OCS92–58 (1992–11).

* cited by examiner

Primary Examiner—Robert H. Kim
Assistant Examiner—Courtney Thomas
(74) Attorney, Agent, or Firm—Young & Thompson

(57) ABSTRACT

An optical amplification apparatus has a first optical amplification unit and a second optical amplification unit connected in tandem with an optical attenuator between them. A temperature sensor is located in the vicinity of an optical fiber included in the second optical amplification unit. A reference voltage generation circuit controls an automatic gain control (AGC) circuit according to an output signal of the temperature sensor Alight signal detector detects maximum or minimum power from among the powers of the wavelength components output from the second optical amplification unit. The AGC adjusts the pumping power to set maximum/minimum to a predetermined value.

24 Claims, 10 Drawing Sheets

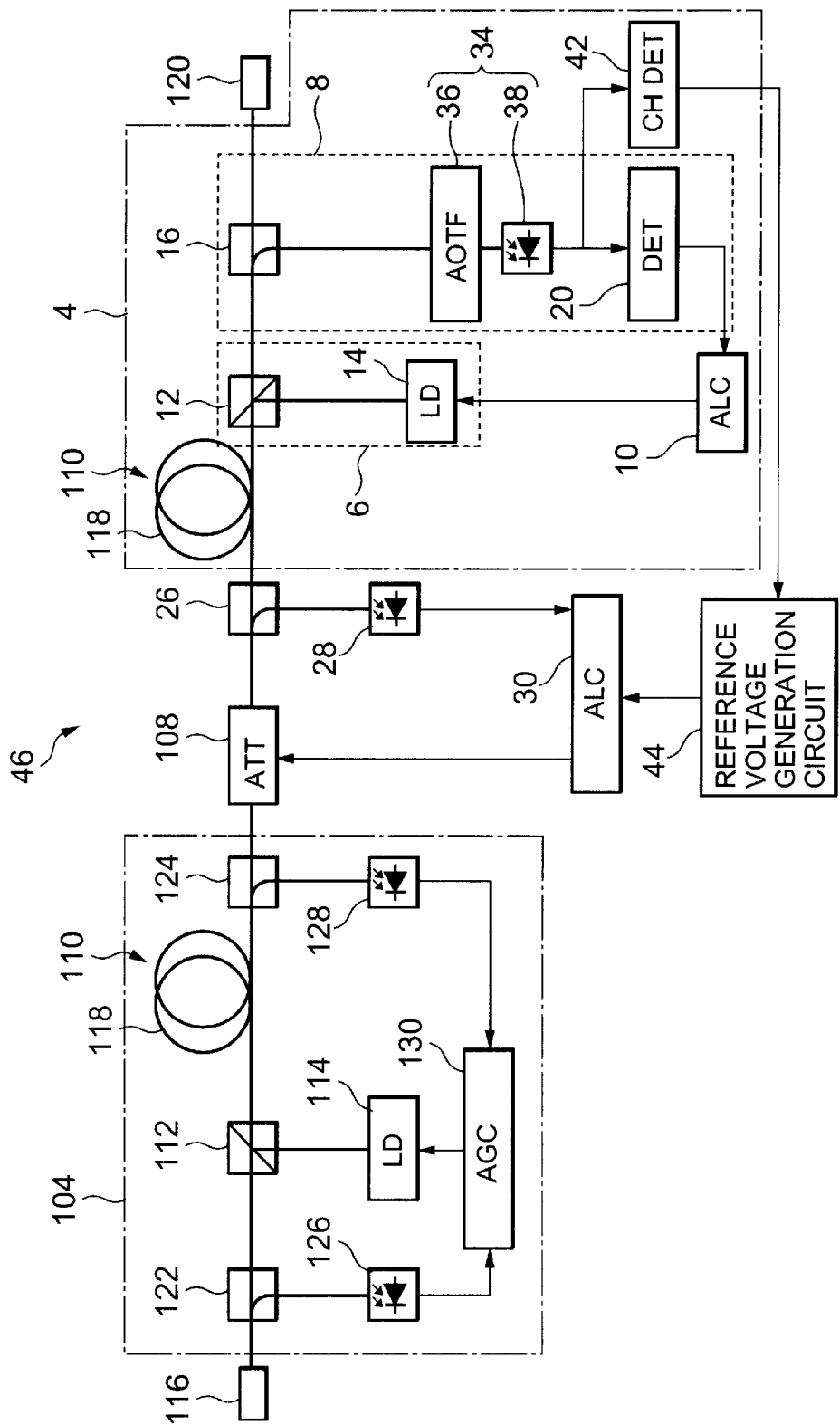

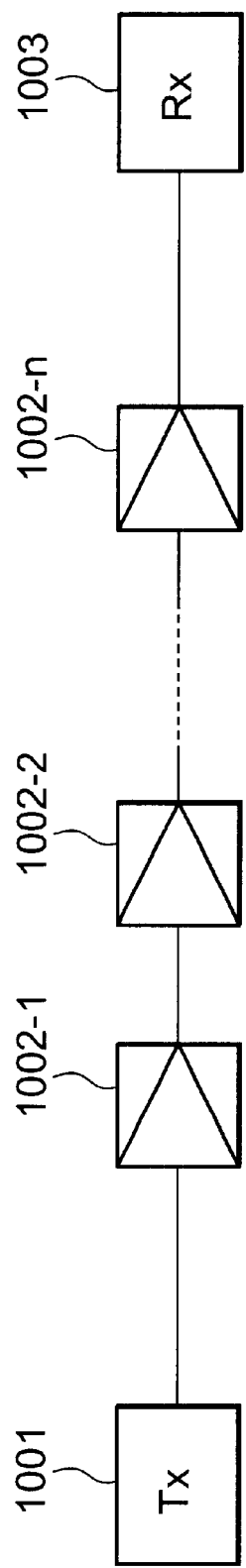

OPTICAL AMPLIFIER CONTROL UNIT, OPTICAL AMPLIFICATION APPARATUS, AND TRANSMISSION SYSTEM

BACKGROUND OF THE INVENTION

1. Field of the Invention

The present invention relates to an optical amplifier control unit, an optical amplification apparatus, and a transmission system that are employed in optical communication or optical information processing. More particularly, the present invention is concerned with an optical amplifier control unit, an optical amplification apparatus, and a transmission system capable of maintaining the flatness of an amplification characteristic despite a change in ambient temperature.

2. Description of Related Art

For long-distance optical communication systems, a technique according to which an optical amplifier is inserted in an optical fiber transmission line is beginning to be generally adopted as one of means for extending a transmission distance. The optical amplifier is widely used to compensate for a distribution loss occurring in a light distribution system for distributing a light signal to various places.

In the past, an optical fiber amplifier that uses a rare-earth doped optical fiber as a gain medium or a semiconductor optical amplifier that utilizes the stimu ated emission phenomenon occurring in a semiconductor has been known as optical amplifiers for directly amplifying a light signal. Currently, the optical fiber amplifier is generally adopted as commercially available optical amplifiers.

For adapting the optical amplifiers to optical transmission systems or the like, it is necessary to retain a light signal at a certain level at any points in the system. This is intended to stabilize a transmission characteristic. Consequently, a facility is required for retaining a gain, which is produced by an optical amplifier inserted in a transmission line, at a certain level.

For stabilizing a gain to be produced by an optical amplifier, a configuration for detecting the intensity of a light signal input to the optical amplifier and that of a light signal output therefrom has been employed in the past. The pumping power supplied to the optical amplifier is adjusted so that the ratio of the power of one light signal to that of the other light signal will be set to a predetermined value. Owing to the configuration, the gain to be produced by the optical amplifier is set to a nearly constant value.

For increasing the transmission capacity of an optical transmission system, a wavelength-division multiplexed transmission technology has been discussed in earnest. In wavelength-division multiplexed transmission, a difference in power between components of different wavelengths constituting a wavelength-division multiplexed light signal is requested not to be very large. When the power difference is large, a signal-to-noise ratio to be detected relative to a feeble wavelength component is degraded markedly, and a transmission error is likely to occur. Especially, when a plurality of optical amplifiers is used to amplify and repeat a light signal in multiple stages, the optical amplifiers should preferably exhibit as flat a gain characteristic as possible relative to the wavelength components of the light signal to be amplified.

However, for a light signal of a wavelength of 1580 nm, an optical amplification apparatus becomes quite temperature-dependent. The flatness in the gain characteristic of the apparatus may largely deteriorate with a temperature change. It is therefore requested to take measures for maintaining the flatness.

SUMMARY OF THE INVENTION

An object of the present invention is to provide an optical amplifier control unit, an optical amplification apparatus, and a transmission system in which the flatness in a gain characteristics relative to a wavelength will not deteriorate despite a change in temperature.

An optical amplifier control unit in accordance with the present invention comprises a first photo-detector, a second photo-detector, a temperature sensor, and an automatic gain control circuit. The first photo-detector detects the power of light input to an optical amplification apparatus that is an object of control. The second photo-detector detects the power of light output from the optical amplification apparatus. The temperature sensor detects an ambient temperature of the optical amplification apparatus, and outputs the results of detection in the form of a temperature detection signal. Outputs of the first and second photo-detectors are fed to the automatic gain control circuit. The automatic gain control circuit produces a control signal used to adjust the strength of pumping performed in the optical amplification apparatus according to the temperature detection signal so that the ratio of the power of the input light to that of the output light will remain constant.

Another optical amplifier control unit in accordance with the present invention comprises a light signal detector and an automatic gain control circuit. The light signal detector detects the maximum or minimum power from among the powers of the wavelength components of light output from an optical amplification apparatus that is an object of control. The automatic gain control circuit produces a control signal used to adjust the strength of pumping performed in the optical amplification apparatus so that the maximum or minimum power will be set to a predetermined value.

An optical amplification apparatus in accordance with the present invention comprises a first optical amplifier and an optical amplifier control unit having either of the foregoing configurations for controlling the optical amplifier.

A transmission system in accordance with the present invention comprises an optical transmitter, an optical reproduction repeater, and an optical receiver. The optical transmitter transmits a light signal over a light transmission line. The optical reproduction repeater is inserted in the optical transmission line and amplifies the light signal traveling over the optical transmission line. The optical receiver receives the light signal sent over the optical transmission line. The optical reproduction repeater is realized with the optical amplification apparatus.

BRIEF DESCRIPTION OF THE DRAWINGS

The above and other objects, features, and advantages of the present invention will become more apparent from the following detailed description when taken in conjunction with the accompanying drawings wherein:

FIG. 9 is a block diagram showing the configuration of an optical amplification apparatus in accordance with the seventh embodiment of the present invention; and FIG. 10 is a block diagram showing the configuration of a transmission system in which an optical amplification apparatus in accordance with the present invention is used as an optical regenerative repeater.

DETAILED DESCRIPTION OF THE PREFERRED EMBODIMENTS

To begin with, a conventional optical amplifier will be described for a better understanding of the present invention before a description is made of an optical amplifier in accordance with the present invention.

Figure 1:
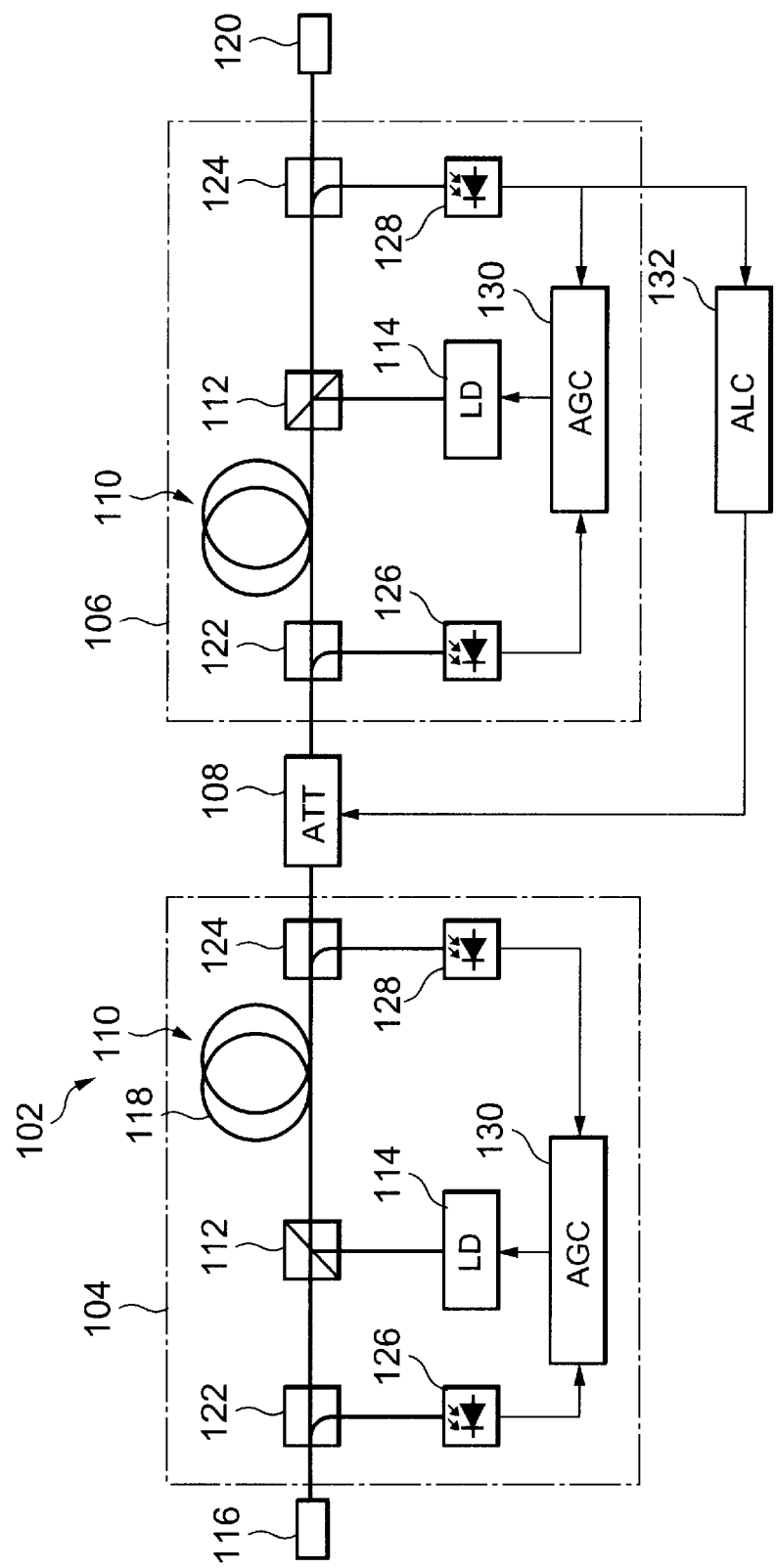
FIG. 1 is a block diagram showing the configuration of a conventional optical amplification apparatus.

FIG. 1 shows the configuration of a conventional amplification apparatus. An optical amplification apparatus 102 shown in FIG. 1 has first and second optical amplification units 104 and 106. A light signal amplified by the first optical amplification unit 104 is fed to the second optical amplification unit 106 via an optical attenuator 108, and further amplified by the second optical amplification unit 106. The optical amplification apparatus 102 is used as an optical regenerative repeater to be included in, for example, a wavelength-division multiplexed transmission system.

The first and second optical amplification units 104 and 106 have basically the same configuration, and each comprises an optical fiber 110 and peripheral devices for controlling a gain. The optical fiber 110 is composed of erbium-doped optical fibers. Over the optical fiber 110, a light signal is amplified with a gain according to the pumping light power. The first optical amplification unit 104 has an optical coupler 112 inserted in an input stage of the optical fiber 110. In contrast, the second optical amplification unit 106 has an optical coupler 112 inserted in an output stage of the optical fiber 110. A pumping source 114 generates pumping light. The pumping light is fed to the optical couplers 112. The pumping source 114 and optical coupler 112 constitute a gain control means for controlling the amplifier gain performed on a light signal over the optical fiber 110.

A light signal is fed to the first optical amplification unit 104 through an input port 116 connected on the optical fiber 110 and propagated over the optical fiber 110. The optical coupler 112 passes the light signal towards an optical fiber 118. The optical coupler 112 reflects pumping light emanating from the pumping source 114, and propagates it towards the optical fiber 118.

In the second optical amplification unit 106, the optical coupler 112 passes a light signal sent over the optical fiber 118 towards an output port 120. Moreover, the optical coupler 112 reflects pumping light emanating from the pumping source 114 and propagates it towards the optical fiber 118.

In the first and second optical amplification units 104 and 106, optical dividers 122 and 124 are inserted in the input and output stages of the optical fiber 110. Part of a light signal propagated over the optical fiber 110 is separated by the optical dividers 122 and 124, and input to the photo-detectors 126 and 128.

The photo-detectors 126 and 128 detect a light signal sent from the optical dividers 1 and 2, converts the light signal into an electric signal, and output the electric signal to an automatic gain control (hereinafter AGC) circuit 130. The AGC circuit 130 applies a control voltage to the pumping source 114 so that the ratio of the level of the electric signal sent from the photo-detector 126 to that sent from the photo-detector 128 will remain nearly constant.

In the first and second optical amplification units 104 and 106, the photo-detectors 126 and 128 detect the intensity of a light signal inputted to the optical fiber 110 and that of a light signal fetched therefrom. The AGC circuit 130 applies a control voltage to the pumping source 114 to adjust the output light power so that the ratio of the intensity of one light signal to that of the other light signal will be set to a predetermined constant value. Consequently, a gain to be produced by the first and second optical amplification units 104 and 106 is always set to a nearly constant value.

To be more specific, the level of a light signal in the output stage of the optical fiber 110 may not be sufficiently higher than the level thereof in the input stage because of a small gain given to the light signal over the optical fiber 110. In this case, the AGC circuit 130 outputs a high control voltage so as to increase the output light power of the pumping source 114. Consequently, more intense pumping light is fed to the optical fiber 110. This leads to a large gain given over the optical fiber 110.

On the contrary, the level of a light signal in the output stage of the optical fiber 110 may be too higher than the level thereof in the input stage because of a large gain given to the light signal over the optical fiber 110. In this case, the AGC circuit 130 outputs a low control voltage so as to decrease the output light power of the pumping source 114. Consequently, feebler pumping light is fed to the optical fiber 110. This results in a small gain given over the optical fiber 110.

As shown in FIG. 1, a light signal amplified by the first optical amplification unit 104 is input to the optical divider 122 included in the second optical amplification unit 106 via the optical divider 124 and optical attenuator 108. The light signal is then placed on the optical fiber 110 included in the second amplification unit 106. An automatic level control (ALC) circuit 132 controls the optical attenuator 108.

The optical attenuator 108 and automatic level control circuit 132 are intended for controlling a light signal so that the intensity of the light signal will be set to a predetermined nearly constant value in the output stage of the second optical amplification unit 106.

Assume that the light signal in the output stage of the second optical amplification unit 106 is intense and that the level of an electric signal output from the photo-detector 128 is high. In this case, the automatic level control circuit 132 controls the optical attenuator 108 so as to increase the magnitude of optical attenuation of the optical attenuator 108. In contrast, assume that the light signal in the output stage of the second optical amplification unit 106 is feeble and that the level of an electric signal output from the photo-detector 128 is low. In this case, the automatic level control circuit 132 controls the optical attenuator 108 so as to decrease the magnitude of optical attenuation of the optical attenuator 108. Consequently, a light signal whose intensity remains nearly constant all the time is output through the output port 120.

When the optical amplification apparatus 102 is included in a wavelength-division multiplexed transmission system, if there is a large difference in intensity between the wavelength components of a light signal, a signal-to-noise ratio relative to a feeble wavelength component is degraded markedly during, especially, multi-stage repeating. Consequently, the system becomes prone to a transmission error. Therefore, the optical amplification apparatus 102 preferably exhibit a flat gain characteristic relative to the range of wavelengths employed.

However, when a light signal wavelength is in a 1580 nm band, the optical amplification apparatus is quite temperature-dependent. The flatness in the gain characteristic of the apparatus may largely deteriorate with a temperature change. It is therefore requested to take measures for maintaining the flatness.

First Embodiment

Embodiments of the present invention will be described with reference to the drawings.

Figure 2:
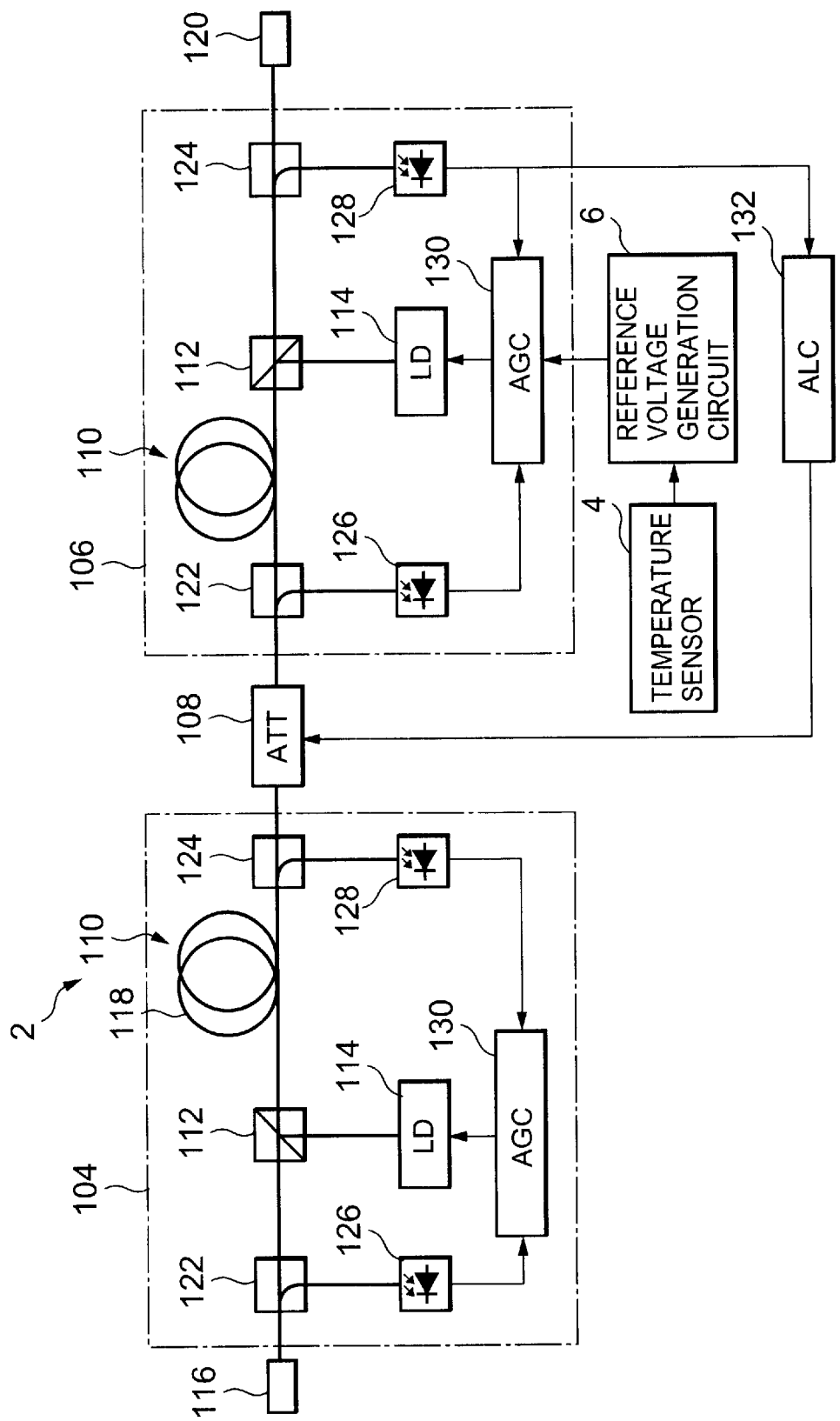
FIG. 2 is a block diagram showing the configuration of an optical amplification apparatus in accordance with the first embodiment of the present invention.

FIG. 2 is a block diagram showing the configuration of an optical amplification apparatus in accordance with the present embodiment. In the drawing, the same reference numerals are assigned to components identical to those shown in FIG. 1. The description of the components will be omitted.

An optical amplification apparatus 2 shown in FIG. 2 is different from the one shown in FIG. 1 in a point that a temperature sensor 4 and a reference voltage generation circuit 6 (AGC control circuit in accordance with the present invention) are included in relation to the second optical amplification unit 106.

The temperature sensor 4 is located near the optical fiber 110 included in the second optical amplification unit 106. The temperature sensor 4 detects the ambient temperature of the optical fiber 110 and outputs a signal indicating the results of detection.

The reference voltage generation circuit 6 controls the AGC circuit 130 according to an output signal of the temperature sensor 4. The reference voltage generation circuit 6 causes the AGC circuit 130 to output a control voltage. The control voltage is used to instruct the pumping source to feed pumping light to the optical fiber 110 in such a manner that as a temperature indicated by the output signal of the temperature sensor 4 is higher, the pumping light will be more intense.

Specifically, the reference voltage generation circuit 6 generates a reference voltage in such a manner that when the output signal of the temperature sensor 4 indicates a higher temperature, the reference voltage will have a higher level. The AGC circuit 130 in the second optical amplification unit 106 outputs the control voltage to the pumping source 114 so that as the reference voltage is higher, a higher gain than usual will be set.

Next, the operation of the optical amplification apparatus 2 having the foregoing components will be described.

FIG. 3(A) to FIG. 3(F) are graphs indicating gain characteristics to be exhibited by the second optical amplification unit 106. In the drawings, the axis of abscissas indicates a wavelength. The axis of ordinates in FIG. 3(A) to FIG. 3(C) and FIG. 3(F) indicates a gain, while the axis of ordinates in FIG. 3(D) and FIG. 3(E) indicates an output level.

Figure 3A:
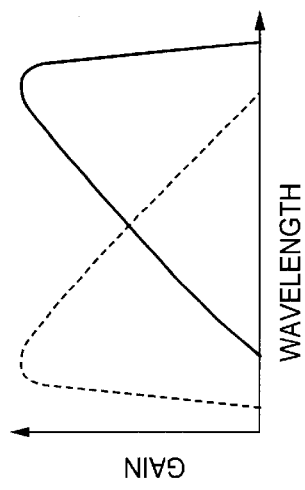
FIG. 3(A) to FIG. 3(F) are graphs indicating gain characteristics to be exhibited by a second optical amplifier.

FIG. 3(A) indicates a gain characteristic the second optical amplification unit 106 exhibits at a normal temperature.

Figure 3B:
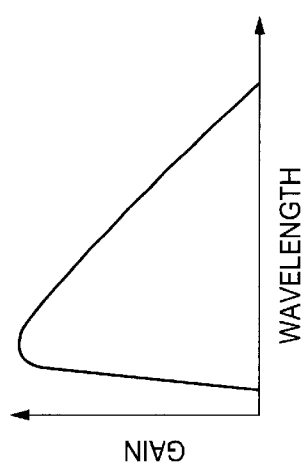
Figure 3C:
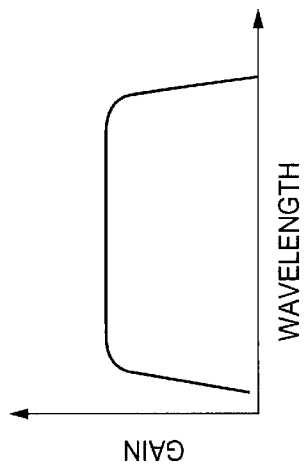
Figure 3D:
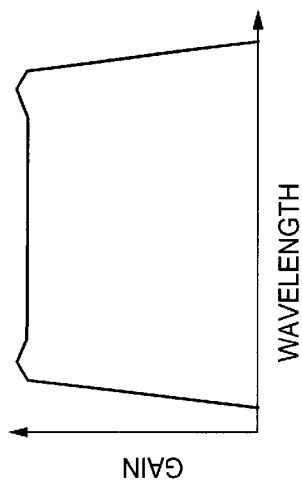

FIG. 3(A) demonstrates that the second optical amplification unit exhibits a nearly flat gain characteristic relative to the whole range of wavelengths employed because the output light power of the pumping source 114 is set properly. The output level of a light signal therefore remains, as shown in FIG. 3(D), nearly constant irrespective of the wavelength thereof. Lengthwise lines in FIG. 3(D) indicate output levels relevant to wavelengths.

Figure 3E:
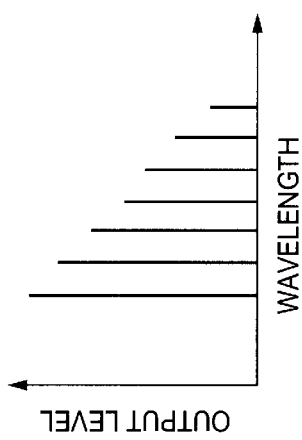

Assume that the temperature of the optical fiber 110 rises with an increase in the ambient temperature of the optical fiber 110. In this case, when the present invention is not implemented, as shown in FIG. 3(B), when a light signal has a larger wavelength, a gain to be given to the light signal decreases more greatly. The flatness in the gain characteristic of the second optical amplification unit is lost. Consequently, as shown in FIG. 3(E), when the light signal has a larger wavelength, the output level thereof is lower.

As mentioned above, when the temperature of the optical fiber 110 rises, the gain given to the light signal having a larger wavelength is small. The gain characteristic exhibited over the optical fiber 110 varies depending on the intensity of pumping light. As shown in FIG. 3(c), when pumping light is intense, the gain given to the light signal having a larger wavelength is large. In FIG. 3(C), a solid line indicates a gain characteristic to be exhibited when pumping light is intense, and a dot line indicates a gain characteristic to be exhibited when pumping light is normal and the temperature is high.

Figure 3F:
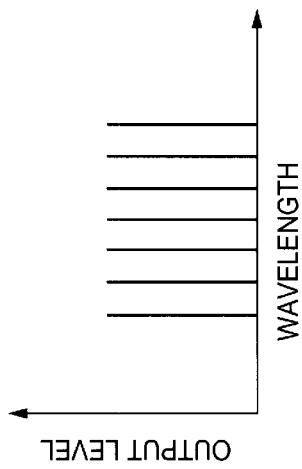

In the present embodiment, the reference voltage generation circuit 6 controls the AGC circuit 130 included in the second optical amplification unit 106 so that as a temperature detected by the temperature sensor 4 is higher, the degree of amplification to be achieved over the optical fiber 110 will be set to a higher value. Therefore, the higher the temperature is, the more intense pumping light to be fed to the optical fiber 110 is. Consequently, a change in the gain characteristic caused by a temperature change (FIG. 3(B)) and a change therein caused by a change in the intensity of pumping light (FIG. 3(C)) are canceled out. As shown in FIG. 3(F), the gain characteristic exhibited over the optical fiber 110 is nearly flat relative to nearly the whole range of wavelengths employed. In other words, the flatness in the gain characteristic of the second amplification unit 106 in the optical amplification apparatus 2 in accordance with the present embodiment does not deteriorate despite a change in temperature.

The changes in the gain characteristic exhibited over the optical fiber shown in FIG. 3 are detailed in "Technical Digest of IEICE (Institute of Information, Electronics and Communication Engineers of Japan), Optical and Quantum Electronics (OQE)" (92-21) and Optical Communication Systems (OCS) (92-58).

According to the present embodiment, the gain characteristic of the second optical amplification unit 106 alone is flattened. Needless to say, the temperature sensor 4 and reference voltage generation circuit 6 may also be included in the first optical amplification unit 104 in order to control the AGC circuit 130 in the first optical amplification unit 104. The gain characteristic of the first optical amplification unit 104 may thus be flattened. This leads to further improvement in the performance of the optical amplification apparatus 2.

When the reference voltage generation circuit 6 is used to control the AGC circuit 130 in the second optical amplification unit 106, deterioration in flatness in the gain characteristic of the second optical amplification unit 106 may be compensated to a greater extent. Thus, deterioration in flatness in the gain characteristic of the first optical amplification unit 104 may be canceled out.

According to the present embodiment, the optical amplification apparatus 2 consists mainly of the first and second optical amplification units 104 and 106. Depending on requested specification, the second optical amplification unit 106 alone may be included.

Second Embodiment

Next, the second embodiment of the present invention will be described below.

Figure 4:
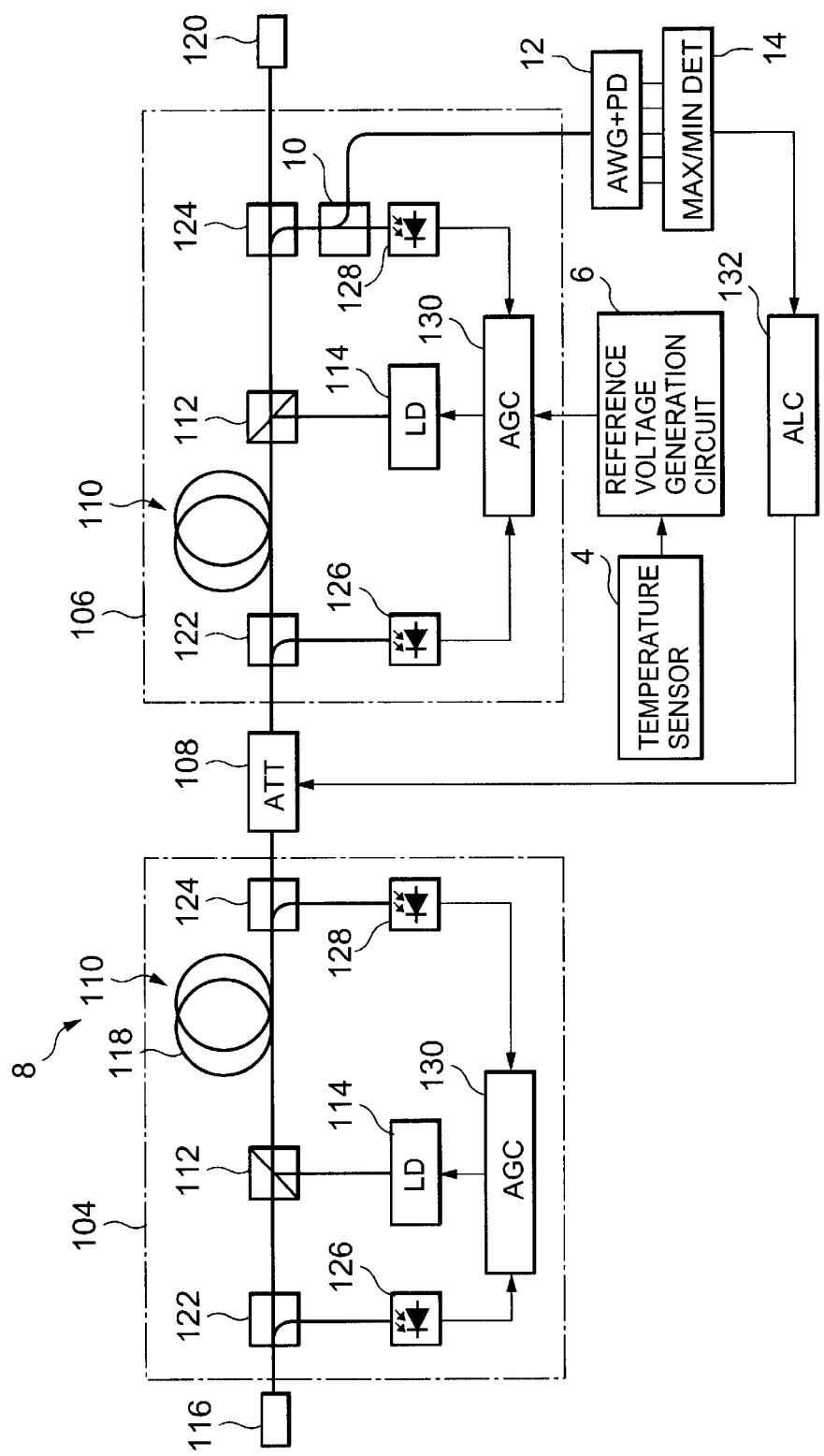
FIG. 4 is a block diagram showing the configuration of an optical amplification apparatus in accordance with the second embodiment of the present invention.

FIG. 4 is a block diagram showing an optical amplification apparatus in accordance with the second embodiment. In the drawing, the same reference numerals are assigned to components identical to those shown in FIG. 2. The description of the components will be omitted.

An optical amplification apparatus 8 shown in FIG. 4 is different from the aforesaid optical amplification apparatus 2 in a point that an optical divider 10, a wavelength separation photo-detector (AWG+PD) 12, and a signal detecting means (MAX/MIN DET) 14 are included in relation to the automatic level control circuit 132.

The optical divider 10 is inserted between the optical divider 124 and photo-detector 128 in the second optical amplification unit 106. The optical divider 10 separates part of a light signal supplied from the optical divider 124 to the photo-detector 128 and inputs it to the wavelength separation photo-detector 12.

The wavelength separation photo-detector 12 detects the intensities of the wavelength components of a light signal and outputs voltages (electric signals) indicating the results of detection. More particularly, the wavelength separation photo-detector 12 consists of a plurality of optical filters (not shown) and a plurality of photo-detectors (not shown). The plurality of optical filters extracts the wavelength components of the light signal. The plurality of photo-detectors converts the light signal components extracted by the optical filters into voltages proportional to the intensities of the light signal components.

The signal detecting means 14 detects the maximum or minimum voltage among the voltages output from the wavelength separation photo-detector 12, and inputs the maximum or minimum voltage to the automatic level control circuit 132.

The automatic level control circuit 132 does not, unlike a conventional one, control the optical attenuator 108 according to the intensity of the light signal composed of the wavelength components fetched from the optical fiber 110. Instead, the automatic level control circuit 132 controls the optical attenuator 108 according to the maximum or minimum power of a light signal.

For example, even when the number of channels decreases and the number of wavelengths employed decreases accordingly, a voltage to be fed to the automatic level control circuit 132 will not be lowered. The intensity of a light signal fetched from the optical fiber 110 in the second optical amplification unit 106 can be controlled to be equal to the intensity attained when the number of channels has not decreased.

The temperature sensor 4 and reference voltage generation circuit 6 in accordance with the present embodiment act independently of the wavelength separation photo-detector 12 and signal detecting means 14. The present embodiment can therefore provide the same advantages as the first embodiment.

Third Embodiment

Next, the third embodiment of the present invention will be described below.

Figure 5:
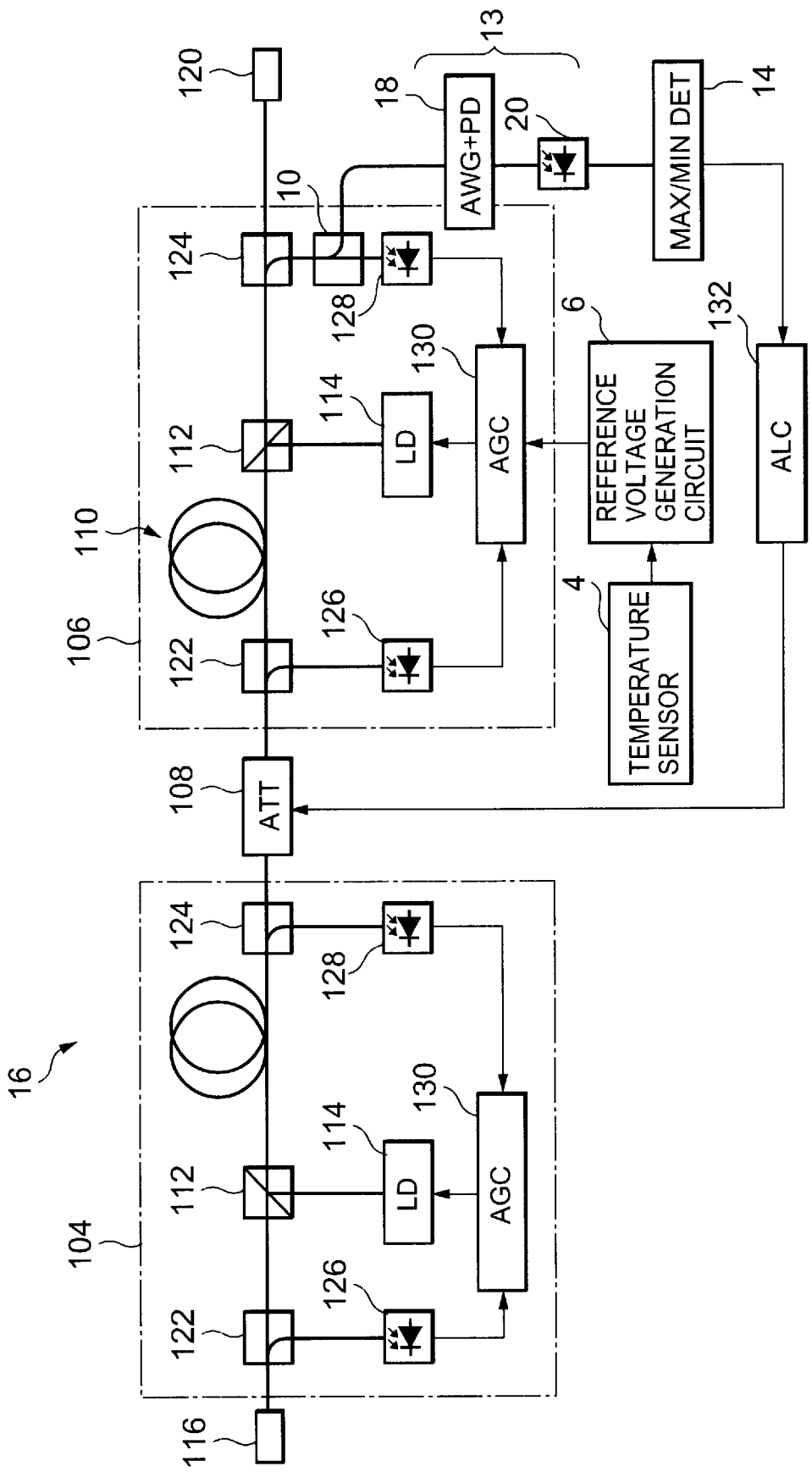
FIG. 5 is a block diagram showing the configuration of an optical amplification apparatus in accordance with the third embodiment of the present invention.

FIG. 5 is a block diagram showing an optical amplification apparatus in accordance with the third embodiment. In the drawing, the same reference numerals are assigned to components identical to those shown in FIG. 2 and FIG. 4. The description of the components will be omitted.

An optical amplification apparatus 16 shown in FIG. 5 is different from the aforesaid optical amplification apparatus 8 in a point that a wavelength separation detector 13 is substituted for the wavelength separation photo-detector 12. The wavelength separation detector 13 consists of an optical filter 18 and a photo-detector 20. An acoustooptic wavelength-tunable optical filter (AOTF) can be used as the optical filter 18. The optical filter 18 scans the wavelength components of a light signal, and successively passes and thus extracts the wavelength components of the light signal. The photo-detector 20 converts the light signal components extracted by the optical filter 18 into electric signals.

The signal detecting means 14 detects the maximum or minimum voltage among the voltages output from the photo-detector 20 proportionally to the wavelength components of the light signal (that is, respective channels), and inputs the detected voltage to the automatic level control circuit 132.

Even in the optical amplification apparatus 16, the automatic level control circuit 132 does not, unlike a conventional one, control the optical attenuator 108 according to the intensity of a light signal consisting of wavelength components fetched from the optical fiber 110. Instead, the automatic level control circuit 132 controls the optical attenuator 108 according to the maximum or minimum power of the light signal.

For example, even when the number of channels decreases and the number of wavelengths employed decreases accordingly, a voltage to be fed to the automatic level control circuit 132 will not be lowered. The intensity of a light signal fetched from the optical fiber 110 in the second optical amplification unit 106 can be controlled to be equal to the intensity attained when the number of channels has not decreased.

Furthermore, according to the present embodiment, the temperature sensor 4 and reference voltage generation circuit 6 act independently of the wavelength separation photo-detector 12 and signal detecting means 14. Even the present embodiment can therefore provide the same advantages as the aforesaid embodiments.

Fourth Embodiment

Next, the fourth embodiment of the present invention will be described with reference to the drawing.

Figure 6:
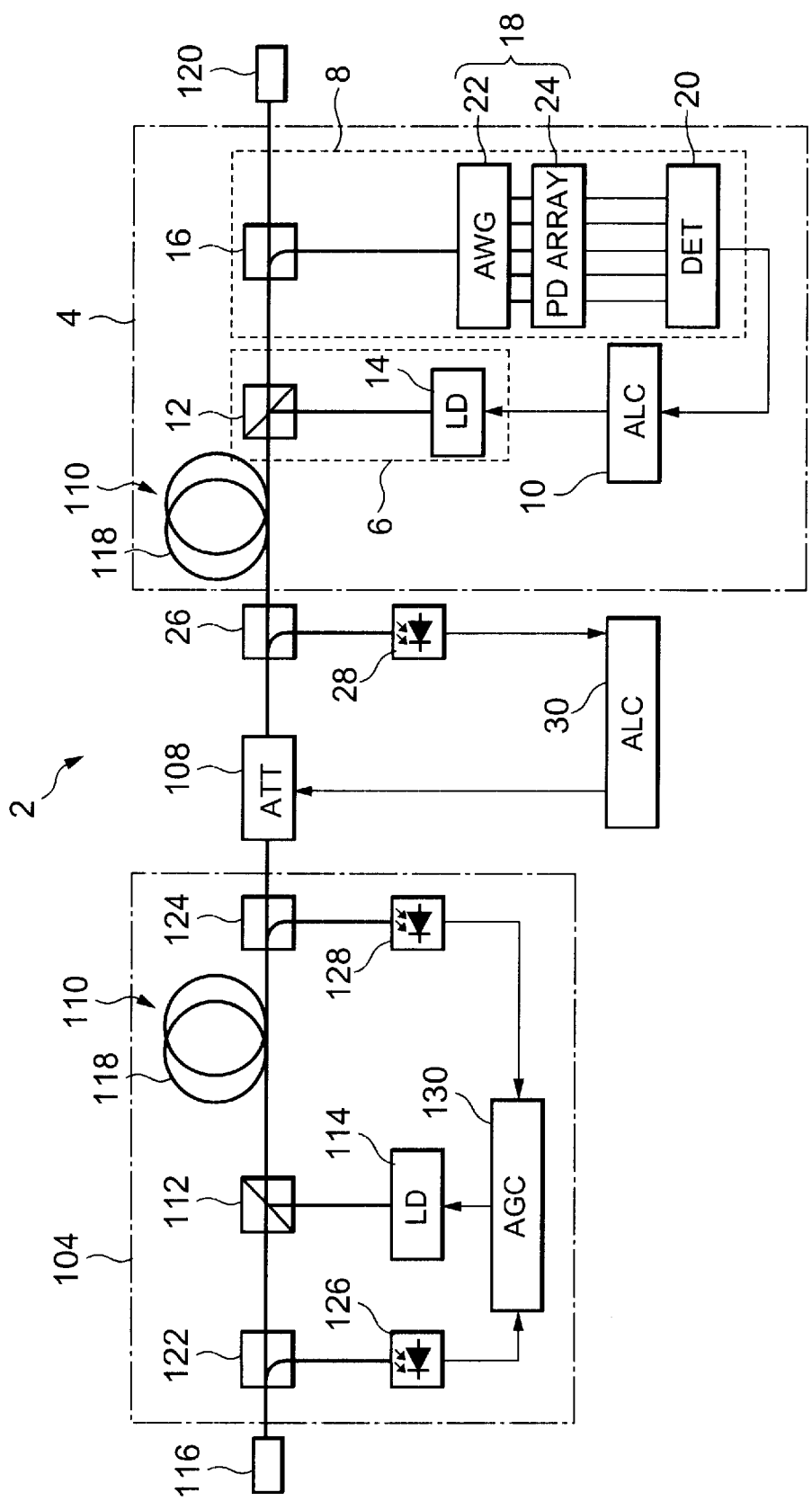
FIG. 6 is a block diagram showing the configuration of an optical amplification apparatus in accordance with the fourth embodiment of the present invention.

FIG. 6 is a block diagram showing the configuration of an optical amplification apparatus in accordance with the present embodiment. In the drawing, the same reference numerals are assigned to components identical to those in FIG. 1. The description of the components will be omitted.

An optical amplification apparatus 2 shown in FIG. 6 is different from the optical amplification apparatus 102 shown in FIG. 1 in terms of a second optical amplification unit 4 and the optical attenuator 108.

The second amplification apparatus 4 has a gain control circuit 6, a light signal detection circuit 8, and an automatic level control (ALC) circuit 10 installed in the output stage of the optical fiber 110.

The gain control circuit 6 feeds pumping light, of which intensity is proportional to a control voltage, to the optical fiber 110, and controls the degree of amplification performed on a light signal over the optical fiber 110.

To be more specific, the gain control circuit 6 comprises an optical coupler 12 and a pumping source 14. A laser diode is used as the pumping source. The optical coupler 12 is inserted in the output stage of the optical fiber 110. The optical coupler 12 passes light traveling over the optical fiber 110, introduces pumping light, which is fed externally, to the optical fiber 110, and propagates the light to the optical fiber 118. The pumping source 14 generates pumping light, whose intensity is proportional to the level of a control voltage, and supplies the light to the optical coupler 12.

The light signal detection circuit 8 detects the maximum or minimum power from among the powers of the components of a light signal having different channels amplified over the optical fiber 110.

The light signal detection circuit 8 comprises, in practice, an optical divider 16, a wavelength separation photo-detector 18, and a signal detecting means (DET) 20. The optical divider 16 separates part of a light signal sent over the body of the optical fiber 110 and inputs it to the wavelength separation photo-detector 18. The wavelength separation photo-detector 18 detects the intensities of the wavelength components of the introduced light signal, and outputs electric signals indicating the results of detection.

The signal detecting means 20 detects an electric signal corresponding to the light signal component having the maximum or minimum power from among the electric signals output from the wavelength separation photo-detector 18, and supplies the electric signal to the automatic level control circuit 10.

The wavelength separation photo-detector 18 in accordance with the present embodiment consists of an arrayed-waveguide grating (hereinafter AWG) 22 and a photo-detector (PD) array 24. The AWG 22 separates and outputs the wavelength components of an input wavelength-multiplexed light signal. The photo-detector array 24 consists of a plurality of photo-detectors for converting the light signal components output from the AWG 22 into electric signals.

The automatic level control circuit 10 produces a control voltage and supplies it to the gain control circuit 6, so that the intensity of a light signal detected by the light signal detection circuit 8 will approach to a predetermined value.

The optical amplification apparatus 2 in accordance with the present embodiment includes an optical divider 26, a photo-detector 28, and an automatic level control circuit 30 for controlling the optical attenuator inserted in the input stage of the optical fiber 110. The optical divider 26 is inserted between the optical attenuator 108 and the optical fiber 118. The photo-detector 28 detects the intensity of a light signal separated by the optical divider 26, and outputs an electric signal that indicates the results of detection. The automatic level control circuit 30 outputs an electric signal according to the output signal of the photo-detector 28 so as to control the optical attenuator 108, so that the intensity of a light signal to be sent over the optical fiber will be stabilized.

Next, the action of the optical amplification apparatus 2 having the foregoing components will be described with reference to FIG. 3(A) to FIG. 3(F).

FIG. 3(A) to FIG. 3(F) are graphs indicating gain characteristics to be exhibited by the second optical amplification unit 4. In the drawings, the axis of abscesses indicates a wavelength. The axis of ordinates in FIG. 3(A) to FIG. 3(c), and FIG. 3(F) indicates a relative gain, while the axis of ordinates in FIG. 3(D) and FIG. 3(E) indicates a relative output level.

FIG. 3(A) indicates a gain characteristic the second optical amplification unit 4 exhibits at a normal temperature. FIG. 3(A) demonstrates that when the output light power of the pumping source 14 is set properly, the second optical amplification unit exhibits a nearly flat gain characteristic relative to the whole range of wavelengths employed. The output level of a light signal remains, as shown in FIG. 3(D), nearly constant relative to all the wavelengths.

Assume that the temperature of the optical fiber 110 rises with an increase in the ambient temperature of the optical fiber 110. In this case, when the present invention is not implemented, a gain decreases relative to the whole range of wavelengths employed. As shown in FIG. 3(B), when a light signal has a larger wavelength, the gain to be given to the light signal decreases more greatly. The flatness in the gain characteristic of the second optical amplification unit is therefore lost. The output level of the light signal decreases relative to all the wavelengths. As shown in FIG. 3(E), when the light signal has a larger wavelength, the output level thereof is lower.

As mentioned above, when the temperature of the optical fiber 110 rises, a gain given to a light signal having a larger wavelength is small. The gain characteristic exhibited over the optical fiber 110 varies depending on the intensity of pumping light. When the pumping light is intensified, the gain increases relative to the whole range of wavelengths employed. As shown in FIG. 3(C), when a light signal has a larger wavelength, the gain to be given to the light signal increases. In the drawing, a solid line indicates a gain characteristic to be exhibited when pumping light is intensified. A dotted line indicates a gain characteristic to be exhibited when the intensity of pumping light is normal and the temperature is high.

According to the present embodiment, the light signal detection circuit 8 detects the maximum or minimum power from among the powers of the wavelength components of a light signal having different channels that are amplified over the optical fiber 110. The automatic level control circuit 10 produces a control voltage and inputs it to the gain control circuit 6, so that the intensity of a light signal detected by the light signal detection circuit 8 will approach to a predetermined value.

For example, when the temperature of the optical fiber 110 rises because the ambient temperature of the optical fiber 110 rises, a gain to be given over the optical fiber 110 by the optical amplification apparatus 2 in accordance with the present embodiment decreases. The intensity of a light signal detected by the signal detection circuit 8 is therefore low. The automatic level control circuit 10 produces a control voltage and inputs it to the gain control circuit 6, so that the light signal will be intensified. Consequently, the gain to be given over the optical fiber 110 increases as a whole. Especially, when a light signal has a larger wavelength, the gain to be given to the light signal increases more greatly.

A change in the gain characteristic caused by a temperature change (FIG. 3 (B)) and a change therein caused by a change in the intensity of pumping light (FIG. 3(C)) are canceled out. Consequently, the gain characteristic exhibited over the optical fiber 110 becomes, as shown in FIG. 3(F), flat. Namely, as far as the optical amplification apparatus 2 in accordance with the present embodiment is concerned, the flatness in the gain characteristic of the second amplification unit 4 will not deteriorate despite a change in temperature.

The optical attenuator 108 and automatic level control circuit 30 work to retain the intensity of a light signal, which is placed on the optical fiber 110 in the second optical amplification unit 4, at a nearly constant value. Specifically, a light signal separated by the optical divider 26 is converted into an electric signal by the photo-detector 28. The automatic level control circuit 30 controls the magnitude of attenuation to be achieved by the optical attenuator 108 according to the level of the electric signal.

For example, when a light signal placed on the optical fiber 110 is intense, a high-level electric signal is input to the automatic level control circuit 30. Consequently, the automatic level control circuit 30 sets the magnitude of attenuation to be achieved by the optical attenuator to a large value. In contrast, when the light signal placed on the optical fiber 110 is feeble, a low-level electric signal is input to the automatic level control circuit 30. Consequently, the automatic level control circuit 30 sets the magnitude of attenuation to be achieved by the optical attenuator to a small value.

According to the present embodiment, the gain characteristic of the second optical amplification unit 4 alone is flattened. Alternatively, the first optical amplification unit 104 may have the same configuration as the second optical amplification unit 4 so that deterioration in flatness in the gain characteristic to be caused by a temperature change can be prevented. This leads to further improvement in the performance of the whole optical amplification apparatus 2.

When the automatic level control circuit 10 controls the pumping source 14 in the second optical amplification unit 4, deterioration in flatness in the gain characteristic of the second optical amplification unit 4 may be compensated to a greater extent. Thus, deterioration in flatness in the gain characteristic of the first optical amplification unit 104 may be canceled out.

Furthermore, according to the present embodiment, the optical amplification apparatus 2 comprises the first and second optical amplification units 104 and 4. Depending on requested specifications, the second optical amplification unit 4 alone may be included.

According to the present embodiment, the optical coupler 12 is inserted in the output stage of the optical fiber 110 in the second optical amplification unit. Alternatively, the optical coupler 12 may be installed in the input stage of the optical fiber 110, so that light emanating from the pumping source 14 can be fed to the optical fiber 118.

Fifth Embodiment

Next, the fifth embodiment of the present invention will be described below.

Figure 7:
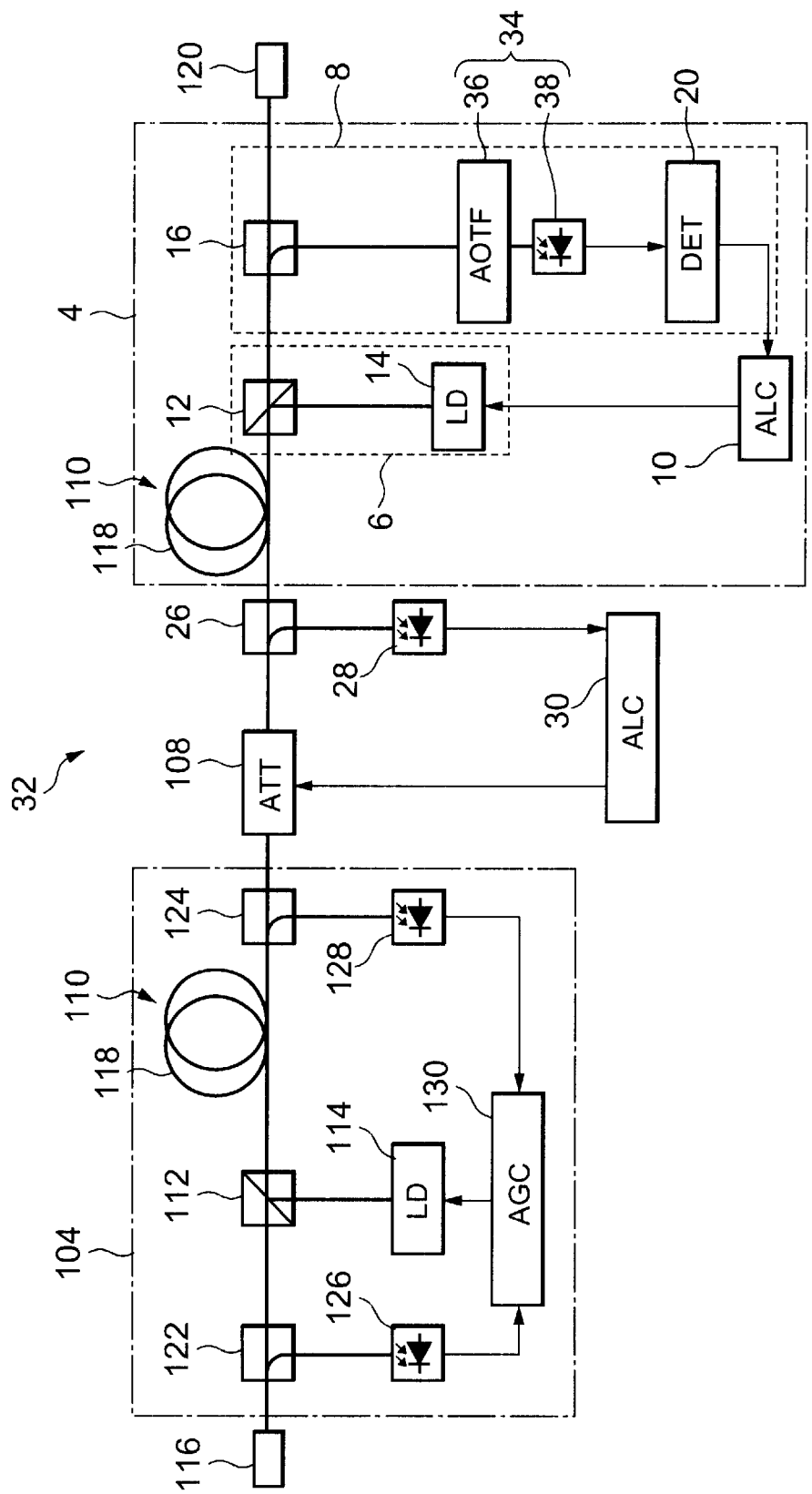
FIG. 7 is a block diagram showing the configuration of an optical amplification apparatus in accordance with the fifth embodiment of the present invention.

FIG. 7 is a block diagram showing an optical amplification apparatus in accordance with the fifth embodiment. In the drawing, the same reference numerals are assigned to components identical to those shown in FIG. 6. The description of the components will be omitted.

An optical amplification apparatus 32 shown in FIG. 7 is different from the optical amplification apparatus 2 of the fourth embodiment in terms of a wavelength separation photo-detector 34. Specifically, in the optical amplification apparatus 32 of the fifth embodiment, the wavelength separation photo-detector 34 comprises an acoustooptic filter (AOTF) 36 and a photo-detector 38. The acoustooptic filter 36 scans the wavelength components of a light signal, and successively passes and extracts the wavelength components. The photo-detector 38 detects the light signal components extracted by the acoustooptic filter 36 into electric signals.

The wavelength separation photo-detector 34 functions similarly to the wavelength separation photo-detector 18 in accordance with the fourth embodiment. The wavelength separation photo-detector 34 detects the intensities of the different wavelength components of a light signal separated by the optical divider 16, and outputs electric signals indicating the results of detection. The signal detection circuit 20 detects an electric signal, which corresponds to a light signal component having the maximum or minimum power, from among the electric signals, and supplies the detected signal to the automatic level control circuit 10.

Even the optical amplification apparatus 32 in accordance with the present embodiment provides the same advantages as the optical amplification apparatus 2 in accordance with the fourth embodiment.

Sixth Embodiment

Next, the sixth embodiment will be described below.

Figure 8:
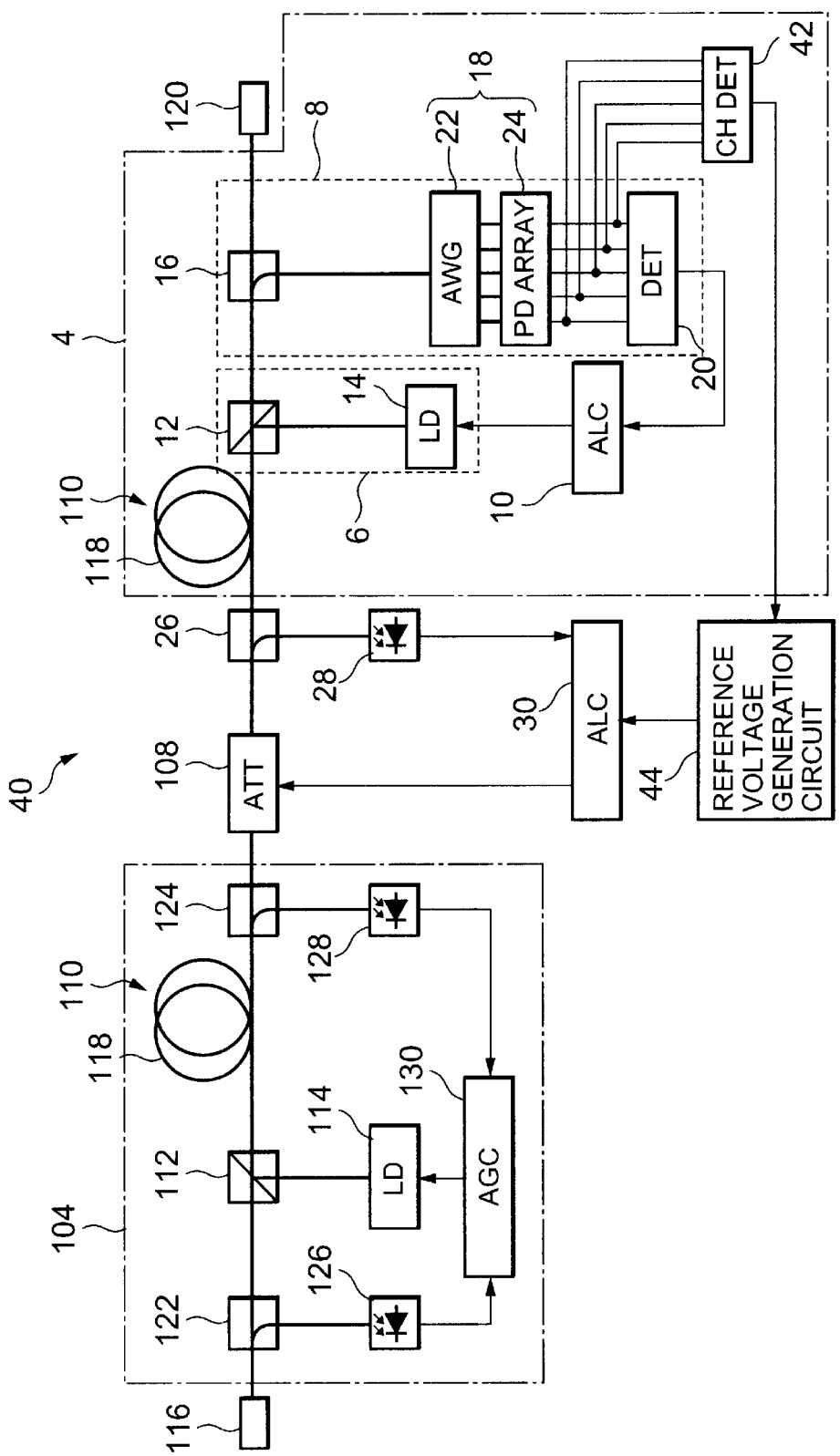
FIG. 8 is a block diagram showing the configuration of an optical amplification apparatus in accordance with the sixth embodiment of the present invention.

FIG. 8 is a block diagram showing an optical amplification apparatus in accordance with the sixth embodiment. In the drawing, the same reference numerals are assigned to components identical to those shown in FIG. 6. The description of the components will be omitted.

An optical amplification apparatus 40 shown in FIG. 8 is different from the optical amplification apparatus 2 in a point that a number-of-channels detection circuit 42 and a reference voltage generation circuit 44 are added in relation to the automatic level control circuit 30.

A plurality of electric signals output from the photo-detector array 24 is input to the number-of-channels detection circuit 42. When the levels of the input electric signals are larger than a reference value, the corresponding channels are judged to be used. The sum total of used channels is counted, and a signal indicating the results of counting is fed to the reference voltage generation circuit 44.

The reference voltage generation circuit 44 generates a reference voltage and inputs it to the automatic level control circuit 30. The larger the number of channels counted by the number-of-channels detection circuit 42 is, the higher the level of the reference voltage is.

The automatic level control circuit 30 sets the magnitude of attenuation to be achieved by the optical attenuator 108 according to an electric signal output from the photo-detector 28. At this time, as the reference voltage output from the reference voltage generation circuit 44 is higher (that is, the number of channels is larger), the magnitude of attenuation to be achieved by the optical attenuator 108 is set to a smaller value.

According to the present embodiment, for example, even when the level of an electric signal output from the photo-detector 28 is high because of a large number of channels, the magnitude of attenuation to be achieved by the optical attenuator 108 will not be set to an unnecessarily large value. The magnitude of attenuation is set to a proper level according to the number of channels. The power of each light signal component of a different channel remains nearly constant irrespective of the number of channels. The light signal is then placed on the succeeding optical fiber 110.

According to the present embodiment, the gain control circuit 6, light signal detection circuit 8, and automatic level control circuit 10 act independently of the number-of-channels detection circuit 42 and reference voltage generation circuit 44. The optical amplification apparatus 40 in accordance with the present embodiment provides the same advantages as the aforesaid optical amplification apparatus in accordance with the embodiments.

Seventh Embodiment

Next, the seventh embodiment will be described below.

FIG. 9 is a block diagram showing an optical amplification apparatus in accordance with the seventh embodiment. The same reference numerals are assigned to components identical to those shown in FIG. 7. The description of the components will be omitted.

An optical amplification apparatus 46 shown in FIG. 9 is different from the optical amplification apparatus 32 in a point that the number-of-channels detection circuit 42 and reference voltage generation circuit 44 are added in relation to the automatic level control circuit 30.

An electric signal output from the photo-detector 38 is input to the number-of-channels detection circuit 42. When the levels of electric signals corresponding to light signal components of different channels (that is, different wavelengths) are larger than a reference value, the corresponding channels are judged to be used. The sum total of used channels is counted, and a signal indicating the results of counting is fed to the reference voltage generation circuit 44.

The optical amplification apparatus 46 provides the same advantages as the optical amplification apparatus 40.

FIG. 10 shows the configuration of a transmission system including any of the aforesaid optical amplification apparatuses. The transmission system consists of an optical transmitter 1001, optical regenerative repeaters 1002-1 to 1002-n, and an optical receiver 1003. The optical amplification apparatus in accordance with any of the aforesaid embodiments is adopted as the optical regenerative repeaters 1002.

As mentioned previously, an AGC circuit in an optical amplification apparatus in accordance with the present invention produces a control signal according to the ambient temperature of an optical fiber that is detected by a temperature sensor. Using the control signal, as the ambient temperature of the optical fiber is higher, more intense pumping light is fed to the optical fiber. Alternatively, an automatic level control circuit produces a control signal and inputs it to a gain control circuit. The control signal is used to approach the maximum or minimum power, which is detected from among the powers of the components of an amplified light signal by a light signal detection circuit, to a predetermined value.

Owing to the foregoing configuration, a change in the gain characteristic caused by a temperature change and a change therein caused by a change in intensity of pumping light are canceled out. The gain characteristic exhibited over an optical fiber becomes flat. In short, the flatness in the gain characteristic of an optical amplification apparatus in accordance with the present invention will not deteriorate despite a change in temperature.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

What is claimed is:

1. An optical amplifier control unit, comprising:
a light signal detector for detecting the maximum or minimum power from among the powers of the wavelength components of light output from an optical amplification apparatus that is an object of control; and
an automatic gain control circuit for producing a control signal, which is used to adjust the pumping power for said optical amplification apparatus, so that the maximum or minimum power will be set to a predetermined value.

2. The optical amplifier control unit according to claim 1, wherein said optical amplification apparatus is an optical fiber amplifier.

3. The optical amplifier control unit according to claim 1, wherein said light signal detector includes a wavelength demultiplexer for separating the wavelength components of an input light signal, and a plurality of photo-detectors for detecting the powers of the wavelength components of light output from said wavelength demultiplexer.

4. The optical amplifier control unit according to claim 1, wherein said light signal detector includes a tunable optical filter in which the range of wavelength components to be passed can be varied, and a photo-detector for detecting the power of light output from said tunable optical filter.

5. The optical amplifier control unit according to claim 3, wherein said wavelength demultiplexer includes an arrayed-waveguide grating.

6. The optical amplifier control unit according to claim 4, wherein said tunable optical filter includes an acoustooptic filter.

7. An optical amplification apparatus, comprising:
a first optical amplifier;
a first photo-detector for detecting a power of light input to said first optical amplifier ;
a second photo-detector for detecting a power of light output from said first optical amplifier;
a temperature sensor for detecting an ambient temperature of said first optical amplifier and outputting the results of detection in the form of a temperature detection signal;
an automatic gain control circuit, to which outputs of said first and second photo-detectors are fed, for producing a control signal, which is used to adjust the pumping power for said first optical amplifier, according to said temperature detection signal so that the ratio of the power of the input light to that of the output light will remain constant;
a second optical amplifier;
an optical attenuator, in which the magnitude of attenuation is varied depending on an input attenuation control signal, for attenuating an output of said second optical amplifier and inputting the results of attenuation to said first optical amplifier;
an automatic level control circuit for detecting the power of light ouput from said first optical amplifier, producing the attenuation control signal so that the power will be set to a predetermined value, and inputting the attenuation control signal to said optical attenuator;
a wavelength demultiplexer for separating the wavelength components of part of light output from said first optical amplifier; and
a signal detector for detecting the maximum or minimum power from among the powers of the wavelength components, wherein said automatic level control circuit outputs the attenuation control signal so that the maximum or minimum power will be set to a predetermined value.

8. The optical amplification apparatus according to claim 7, wherein said wavelength demultiplexer includes an arrayed-waveguide grating.

9. An optical amplification apparatus, comprising:

a first optical amplifier;

a first photo-detector for detecting a power of light input to said first optical amplifier;

a second photo-detector for detecting a power of light output from said first optical amplifier;

a temperature sensor for detecting an ambient temperature of said first optical amplifier and outputting the results of detection in the form of a temperature detection signal;

an automatic gain control circuit, to which outputs of said first and second photo-detectors are fed, for producing a control signal, which is used to adjust the pumping power for said first optical amplifier, according to said temperature detection signal so that the ratio of the power of the input light to that of the output light will remain constant;

a second optical amplifier;

an optical attenuator, in which the magnitude of attenuation is varied depending on an input attenuation control signal, for attenuating an output of said second optical amplifier and inputting the results of attenuation to said first optical amplifier;

an automatic level control circuit for detecting the power of light output from said first optical amplifier, producing the attenuation control signal so that the power will be set to a predetermined value, and inputting the attenuation control signal to said optical attenuator;

a tunable optical filter in which the range of wavelengths components to be passed can be varied; and a signal detector for detecting the maximum or minimum power of light output from said tunable optical filter, wherein said automatic level control circuit outputs the attenuation control signal so that the maximum or minimum power will be set to a predetermined value.

10. The optical amplification apparatus according to claim 9, wherein said tunable optical filter includes an acoustooptic filter.

11. An optical amplification apparatus, comprising:

a first optical amplifier; and an optical amplifier control unit set forth in claim 1 for controlling said optical amplifier.

12. An optical amplification apparatus, comprising:

a first optical amplifier; and an optical amplifier control unit set forth in claim 5 for controlling said optical amplifier.

13. An optical amplification apparatus, comprising:

a first optical amplifier; and an optical amplifier control unit set forth in claim 4 for controlling said optical amplifier.

14. The optical amplification apparatus according to claim 11, wherein said first optical amplifier is realized with an optical fiber amplifier.

15. The optical amplification apparatus according to claim 11, further comprising:

a second optical amplifier;

an optical attenuator, in which the magnitude of attenuation is varied depending on an input attenuation control signal, for attenuating an output of said second optical amplifier and inputting the results of attenuation to said first optical amplifier; and an automatic level control circuit for detecting the power of light output from said optical attenuator, producing the attenuation control signal so that the power will be set to a predetermined level, and inputting the attenuation control signal to said optical attenuator.

16. The optical amplification apparatus according to claim 12, further comprising:

a second optical amplifier;

an optical attenuator, in which the magnitude of attenuation is varied depending on an input attenuation control circuit, for attenuating an output of said second optical amplifier and inputting the results of attenuation to said first optical amplifier; and an automatic level control circuit for detecting the power of light output from said optical attenuator, producing the attenuation control signal so that the power will be set to a predetermined level, and inputting the attenuation control signal to said optical attenuator.

17. The optical amplification apparatus according to claim 13, further comprising:

a second optical amplifier;

an optical attenuator, in which the magnitude of attenuation is varied depending on an input attenuation control circuit, for attenuating an output of said second optical amplifier and inputting the results of attenuation to said first optical amplifier; and an automatic level control circuit for detecting the power of light output from said optical attenuator, producing the attenuation control signal so that the power will be set to a predetermined level, and inputting the attenuation control signal to said optical attenuator.

18. The optical amplification apparatus according to claim 16, further comprising a number-of-channels detection circuit for detecting the number of wavelength components constituting an output of said wavelength demultiplexer, wherein said automatic level control circuit adjusts the predetermined level according to the number of wavelength components.

19. The optical amplification apparatus according to claim 17, further comprising a number-of-channels detection circuit for detecting the number of wavelength components constituting an output of said wavelength demultiplexer, wherein said automatic level control circuit adjusts the predetermined level according to the number of wavelength components.

20. A transmission system, comprising:

an optical transmitter for transmitting a light signal over an optical transmission line;

an optical regenerative repeater, inserted in said optical transmission line, for amplifying the light signal propagated over said optical transmission line; and an optical receiver for receiving the light signal sent over said optical transmission line, wherein said optical regenerative repeater is realized with an optical amplification apparatus set forth in claim 13.

21. A transmission system, comprising:

an optical transmitter for transmitting a light signal over an optical transmission line;

an optical regenerative repeater, inserted in said optical transmission line, for amplifying the light signal propagated over said optical transmission line; and an optical receiver for receiving the light signal sent over said optical transmission line, wherein said optical regenerative repeater is realized with an optical amplification apparatus set forth in claim 11.

22. A transmission system, comprising:

an optical transmitter for transmitting a light signal over an optical transmission line;

an optical regenerative repeater, inserted in said optical transmission line, for amplifying the light signal propagated over said optical transmission line; and an optical receiver for receiving the light signal sent over said optical transmission line, wherein said optical regenerative repeater is realized with an optical amplification apparatus set forth in claim 18.

23. A transmission system, comprising:

an optical transmitter for transmitting a light signal over an optical transmission line;

an optical regenerative repeater, inserted in said optical transmission line, for amplifying the light signal propagated over said optical transmission line; and an optical receiver for receiving the light signal sent over said optical transmission line, wherein said optical regenerative repeater is realized with an optical amplification apparatus set forth in claim 13.

24. A transmission system, comprising:

an optical transmitter for transmitting a light signal over an optical transmission line;

an optical regenerative repeater, inserted in said optical transmission line, for amplifying the light signal propagated over said optical transmission line; and an optical receiver for receiving the light signal sent over said optical transmission line, wherein said optical regenerative repeater is realized with an optical amplification apparatus set forth in claim 15.

* * * * *